(12) United States Patent
Shveidel et al.

(10) Patent No.: US 11,163,693 B2
(45) Date of Patent: Nov. 2, 2021

(54) HASH-BASED ONE-LEVEL MAPPING FOR STORAGE CLUSTERS

(71) Applicant: EMC IP HOLDING COMPANY LLC, Hopkinton, MA (US)

(72) Inventors: Vladimir Shveidel, Pardes-Hana (IL); Ronen Gazit, Tel Aviv (IL); Uri Shabi, Tel Mond (IL); Tal Ben-Moshe, Kiryat Ono (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 16/526,641

(22) Filed: Jul. 30, 2019

(65) Prior Publication Data
US 2021/0034543 A1 Feb. 4, 2021

(51) Int. Cl.
*G06F 12/1018* (2016.01)
*G06F 3/06* (2006.01)

(52) U.S. Cl.
CPC ........ *G06F 12/1018* (2013.01); *G06F 3/0619* (2013.01); *G06F 3/0653* (2013.01); *G06F 3/0685* (2013.01)

(58) Field of Classification Search
None
See application file for complete search history.

(56) References Cited

U.S. PATENT DOCUMENTS

| 2004/0236720 | A1* | 11/2004 | Basso | H04L 45/00 |
| 2014/0082261 | A1* | 3/2014 | Cohen | G06F 3/0688 711/103 |
| 2019/0042464 | A1* | 2/2019 | Genshaft | G06F 12/0246 |

* cited by examiner

*Primary Examiner* — Denise Tran
(74) *Attorney, Agent, or Firm* — Daly, Crowley, Mofford & Durkee, LLP (57) ABSTRACT

A method comprising: storing, in a memory, a mapping tree that is implemented by using an array of mapping pages, the mapping tree having a depth of D, wherein D is an integer greater than or equal to 0; receiving a write request that is associated with a first type-1 address; storing, in a storage device, data associated with the write request, the data associated with the write request being stored in the storage device based on a first type-2 address; generating a map entry that maps the first type-1 address to the first type-2 address; calculating a first hash digest of the first type-1 address; and storing the map entry in a first mapping page.

20 Claims, 9 Drawing Sheets

| | | | |
|---|---|---|---|
| LBA_1 | 212 | PHYS_ADDR_1 | 214 |
| LBA_2 | 212 | PHYS_ADDR_5 | 214 |
| LBA_3 | 212 | PHYS_ADDR_2 | 214 |
| LBA_4 | 212 | PHYS_ADDR_4 | 214 |
| LBA_5 | 212 | PHYS_ADDR_3 | 214 |
| LBA_6 | 212 | PHYS_ADDR_7 | 214 |
| LBA_7 | 212 | PHYS_ADDR_6 | 214 |
| LBA_8 | 212 | PHYS_ADDR_8 | 214 |

HASH-BASED ONE-LEVEL MAPPING FOR STORAGE CLUSTERS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: storing, in a memory, a mapping tree that is implemented by using an array of mapping pages, the mapping tree having a depth of D, wherein D is an integer greater than or equal to 0; receiving a write request that is associated with a first type-1 address; storing, in a storage device, data associated with the write request, the data associated with the write request being stored in the storage device based on a first type-2 address; generating a map entry that maps the first type-1 address to the first type-2 address; calculating a first hash digest of the first type-1 address; and storing the map entry in a first mapping page, the first mapping page being located at a first index in the array, wherein the first index is the largest index in the array that contains a mapping page among all indices in the array that can be represented by D or fewer least significant bits of the first hash digest.

According to aspects of the disclosure, a system is provided, comprising: a memory configured to store storing a mapping tree that is implemented by using an array of mapping pages, the mapping tree having a depth of D, wherein D is an integer greater than or equal to 0; and a processing circuitry operatively coupled to the memory, the processing circuitry being configured to perform the operations of: receiving a write request that is associated with a first type-1 address; storing, in a storage device, data associated with the write request, the data associated with the write request being stored in the storage device based on a first type-2 address; generating a map entry that maps the first type-1 address to the first type-2 address; calculating a first hash digest of the first type-1 address; and storing the map entry in a first mapping page, the first mapping page being located at a first index in the array, wherein the first index is the largest index in the array that contains a mapping page among all indices in the array that can be represented by D or fewer least significant bits of the first hash digest.

According to aspects of the disclosure, a non-transitory computer-readable medium storing one or more processor-executable instructions, which when executed by at least one processor, cause the at least one processor to perform the operations of: storing, in a memory, a mapping tree that is implemented by using an array of mapping pages, the mapping tree having a depth of D, wherein D is an integer greater than or equal to 0; receiving a write request that is associated with a first type-1 address; storing, in a storage device, data associated with the write request, the data associated with the write request being stored in the storage device based on a first type-2 address; generating a map entry that maps the first type-1 address to the first type-2 address; calculating a first hash digest of the first type-1 address; and storing the map entry in a first mapping page, the first mapping page being located at a first index in the array, wherein the first index is the largest index in the array that contains a mapping page among all indices in the array that can be represented by D or fewer least significant bits of the first hash digest.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
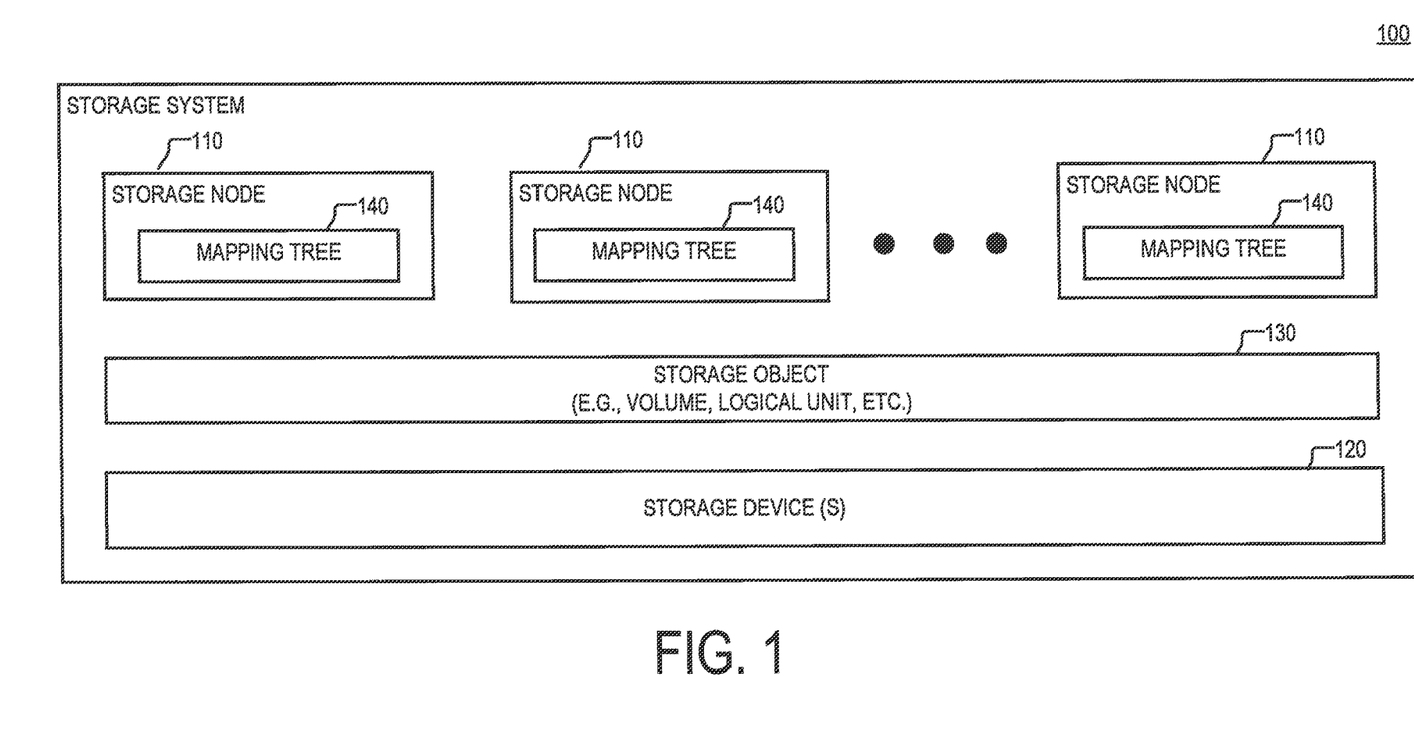
FIG. 1 is a diagram of an example of a storage system, according to aspects of the disclosure.
Figure 8:
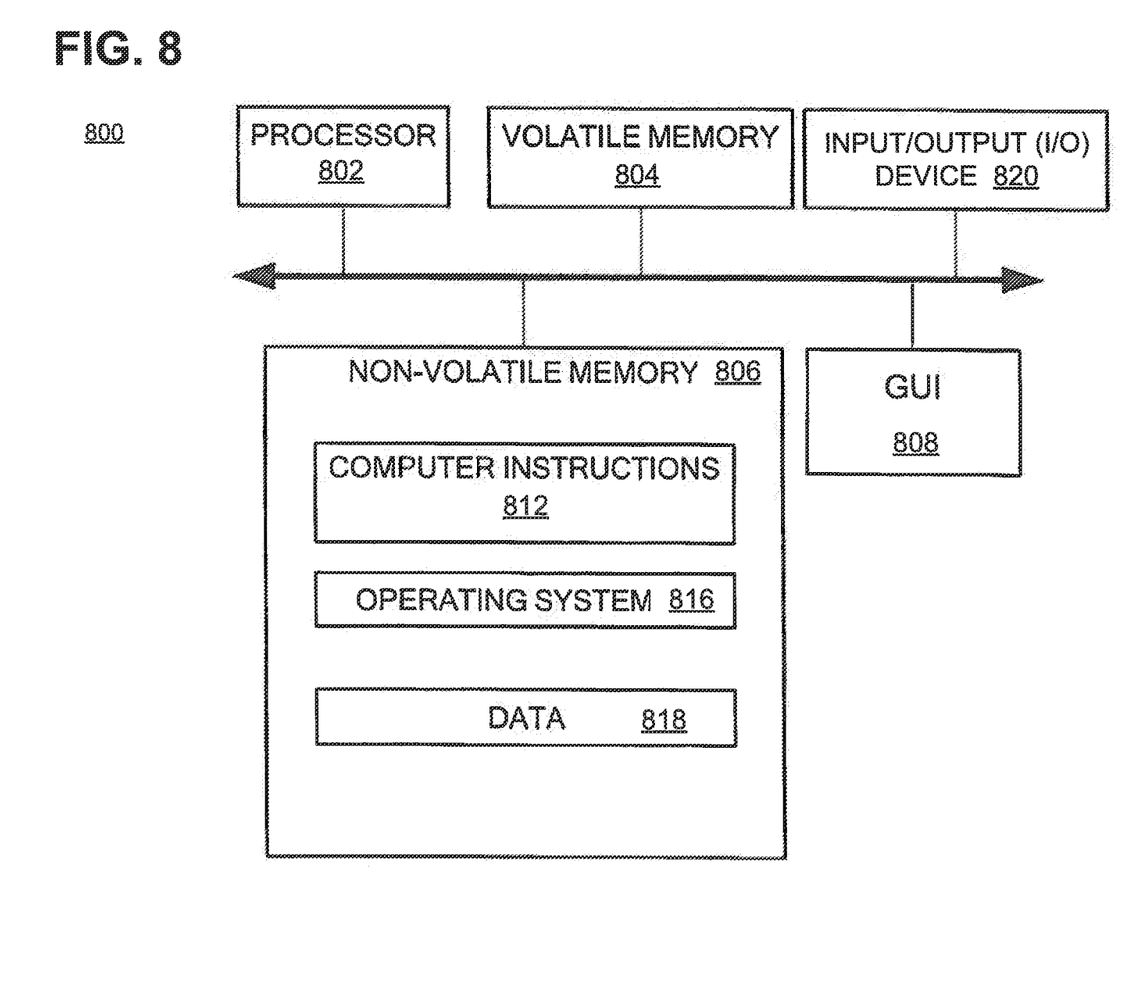
FIG. 8 is a diagram of an example of a computing device, according to aspects of the disclosure.

FIG. 1 is a diagram of an example of a storage system 100, according to aspects of the disclosure. The storage system 100 may include a plurality of storage nodes 110 and one or more storage devices 120. Each storage node 110 may include a computing device, such as the computing device 800 that is shown in FIG. 8. In operation, each of the storage nodes 110 may be used to service (at least in part) I/O requests from host devices (not shown) that are connected to the storage system 100 via a communications network (e.g., LAN, WAN, the Internet, etc.). As used through the disclosure, the term "storage node" may refer to any computing device within a storage system, irrespective of its specific function. Each of the storage devices 120 may include a solid-state drive (SSD), a Hard Disk, a Random-Access Memory (RAM), a flash memory, a Read-Only Memory (ROM) and/or any other suitable type of volatile or non-volatile memory. According to the present example, the storage devices 120 are configured to operate as a data storage array (e.g., a RAID 6 array). However, the present disclosure is not limited to any specific configuration of the storage devices 120.

Furthermore, the storage devices 120 may be used, by the storage system 100, to provide the physical medium that receives data that is (logically) stored in a storage object 130. The storage object 130 may include a data volume, a logical unit (LU), a database, and/or any other suitable type of object that is used, at least in part, for the retrieval and storage of data in the storage devices 120. In some implementations, the storage object 130 may have an address space (hereinafter "logical address space") that is mapped to a physical address space of the storage array via a mapping tree 140. According to the present example, an instance of the mapping tree is stored in each of the storage nodes 110. As is further discussed below, the mapping tree 140 may be used to perform logical-to-physical address translation when data is read from or stored in the data storage array.

Figure 2A:
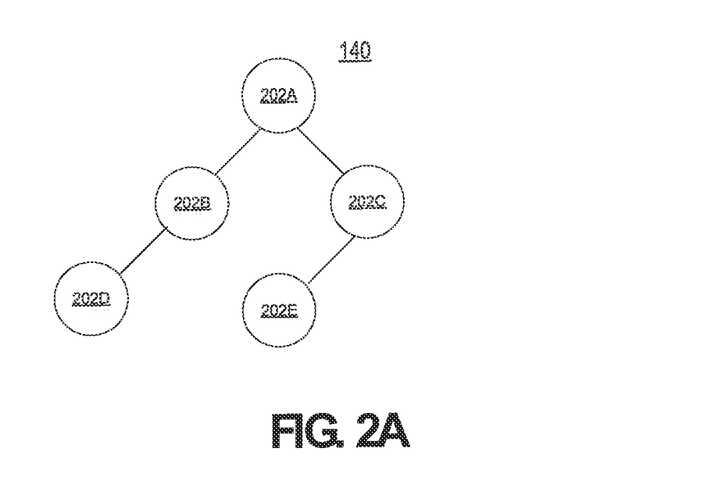
FIG. 2A is a diagram of an example of a mapping tree, according to aspects of the disclosure.
Figure 2B:
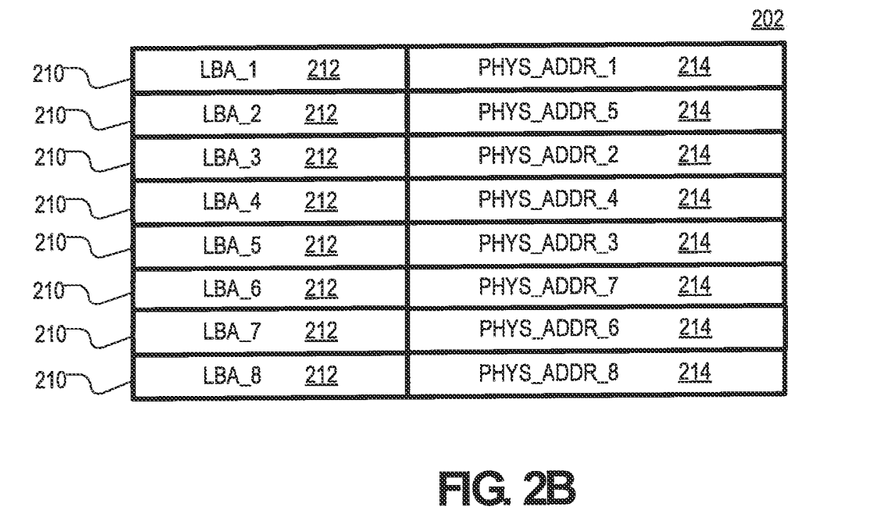
FIG. 2B is a diagram of an example of a mapping page, according to aspects of the disclosure.

FIG. 2A shows the mapping tree 140 in further detail. As illustrated, the mapping tree 140 may be a binary tree graph, and each node in the graph may include a respective mapping page 202. FIG. 2B shows the composition of the mapping pages 202 in further detail. As illustrated, each mapping page 202 may include a data structure having a plurality of map entries 210. Each map entry 210 may associate a different logical block address (LBA) 212 to a respective physical address 214. Each of the LBAs 212 may include a different logical address in the logical address space of the storage object 130. Each of the physical addresses 214 may include a different physical address in the physical address space of the data storage array (which is implemented by using the storage devices 120).

Figure 2C:
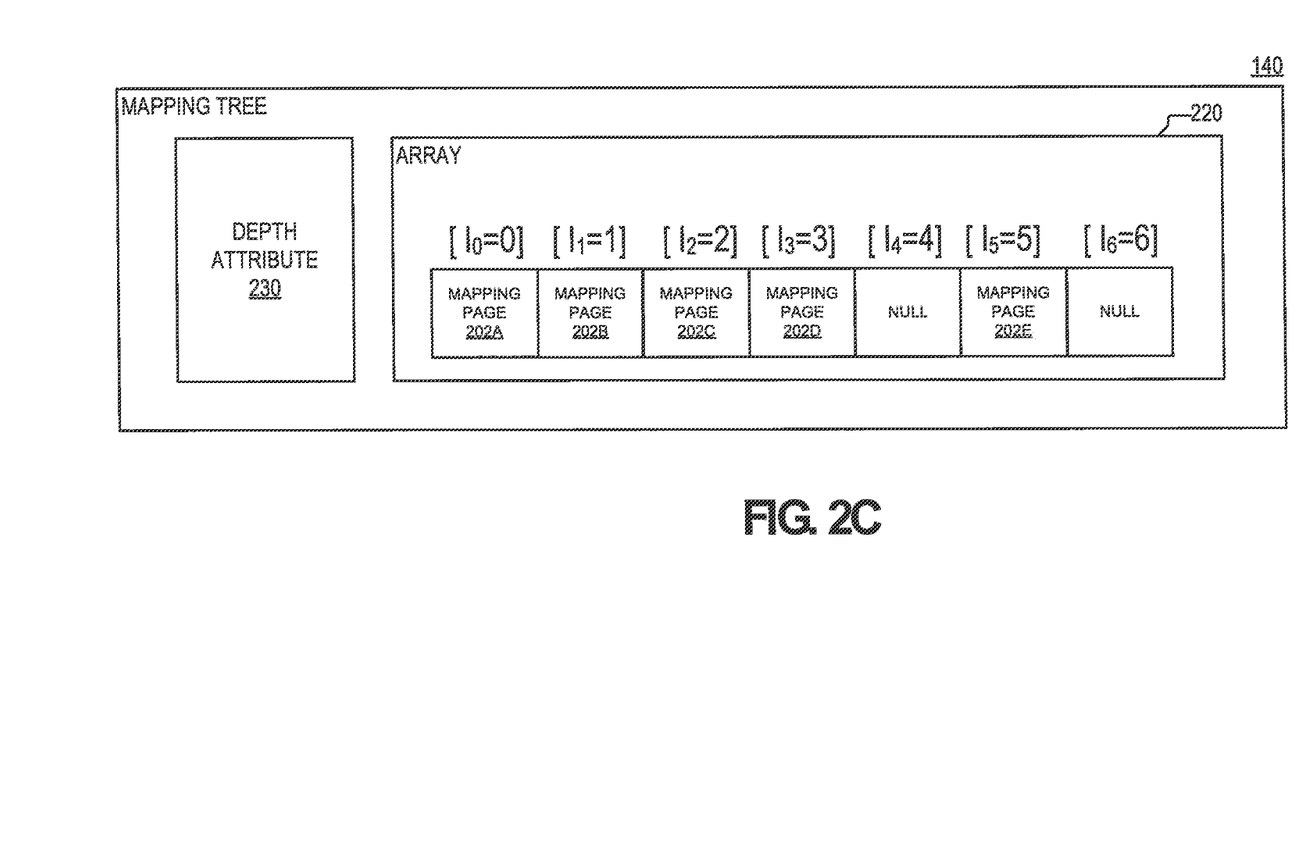
FIG. 2C is a diagram of an example of data structure(s) used to represent the mapping tree of FIG. 2A, according to aspects of the disclosure.

FIG. 2C shows an example of data structure(s) used to implement the mapping tree 140. As illustrated, the mapping tree 140 may include an array 220 and a depth attribute 230. The array 220 may include an array of mapping pages 202, and the depth attribute 230 may be an integer whose value indicates the depth of the mapping tree. In the example of FIGS. 2A-C, the depth of the mapping tree is 2. In some implementations, the depth of the mapping tree may be based on the length of the longest path connecting the root of the mapping tree with one of the mapping tree's leaves. For example, in some implementations, the depth of the mapping tree may be equal (or otherwise be based on) the number of nodes (e.g., mapping pages) that are part of the longest path. As another example, in some implementations, the depth of the mapping tree may be equal to (or otherwise be based on) the number of edges on the longest path.

According to the example of FIG. 2C, the array 220 may include indices $I_0$ and $I_6$, which correspond to different elements in the array 220. Each element of the array 220 may be either a mapping page 202 (e.g., a pointer to one of the mapping pages 202) or a NULL value (or another type of invalid value). According to the example of FIG. 2C, a mapping page 202a is stored at index $I_0$ of the array 220; a mapping page 202b is stored at index $I_1$ of the array 220; a mapping page 202c is stored at index $I_2$ of the array 220; a mapping 202d is stored at index $I_3$ of the array 220; and a mapping page 202e is stored at index $I_5$ of the array 220.

Furthermore, according to the example of FIG. 2C, no mapping pages 202 are stored at indices $I_4$ and $I_6$ of the array 220.

According to the nomenclature of the present disclosure, if a mapping page 202 is stored at a given index in the array 220, the given index is said to "contain" this mapping page. By contrast, under the nomenclature of the present disclosure, if a NULL value (or another type of invalid value) is stored at an index in the array 220, that index does not contain a mapping page. Thus, according to the example of FIGS. 2A-C, index $I_0$ contains mapping page 202A, index $I_1$ contains mapping page 202B, index $I_2$ contains mapping page 202C, index $I_3$ contains mapping page 202D, and index $I_5$ contains mapping page 202E. On the other hand, according to the present example, indices $I_4$ and $I_6$ do not contain any mapping pages.

When an I/O request is received at any storage node 110 of the storage system 100, the storage node 110 may obtain an LBA 212 associated with the I/O request. Next, the storage node 110 may calculate an index I based on the LBA 212. Next, the storage node 110 may retrieve the mapping page 202 that is stored, in the array 220, at the calculated index I. Next, one of the mapping pages 202 that is stored in the array 220, at the calculated index I, may be retrieved. Next, a physical address 214 may be obtained from the retrieved mapping page 202. And finally, the obtained physical address 214 may be used to fulfill the I/O request.

In some respects, the value of the index I in the array 220, at which any given mapping page 202 is stored, depends on the LBAs 212 that are being mapped to respective physical addresses 214 by the given mapping page 202. Thus, retrieving a map entry 210 that corresponds to a particular LBA 212 includes: (i) evaluating a function F(LBA)=I, which maps the logical address space of the storage object 130 to the space of indices of the array 220, (ii) retrieving, from the array 220, the mapping page 202 that is stored at index I (that is mapped to the particular LBA by the function F), and performing a search of the retrieved mapping page 202 to identify the map entry 210 that corresponds to the particular LBA 212.

In some respects, map entries 210 may be allocated for only LBAs that are in use. New map entries 210 may be allocated, as I/O requests associated with previously-unused LBAs are received at storage system 100. In some implementations, allocating the map entries 210 on an as-needed basis is advantageous because it may help keep the size of the mapping tree 140 at a minimum. Furthermore, in some implementations, when the storage object 130 is first created, the array 220 (and/or the mapping tree 140) may be empty. In such implementations, the first mapping page 202 may be created (and added to the array 220) when the first write to the storage object 130 is executed. When the first mapping page 202 becomes full, additional mapping pages 202 may be added to the array 220.

Traditional approaches for logical-to-physical mapping may use 3 levels of mappings, including: (i) low-level mappings (leaves) that contain pointers to data, (ii) mid-level mappings that contain pointers to the low-level mappings, and (iii) top-level mappings contain pointers to the mid-level mappings. Such approaches, however, may require the use of three different types of locks (e.g., one for each type of mappings). The added complexity of using multiple types of locks may lead to contention issues, which in turn could degrade system performance. Furthermore, the use of top-level and mid-level mappings may be inefficient for I/O patterns that require a large number of top-level and mid-level mappings to be created for a comparatively small number of low-level mappings.

By contrast, the mapping tree 140 has no page hierarchy, and it can be accessed using only one type of lock. Thus, when the mapping tree 140 is used for logical-to-physical address translation, fewer contention issues may arise than when a 3-level approach is used. Moreover, because the index I of each mapping page 202 (in the array 220) can be calculated arithmetically (e.g., by using the function F), there is no need to maintain mid-level and top-level mappings, which in turn could reduce the total number of mapping objects that need to be maintained per volume, thus leading to a more efficient use of available memory.

Figure 3:
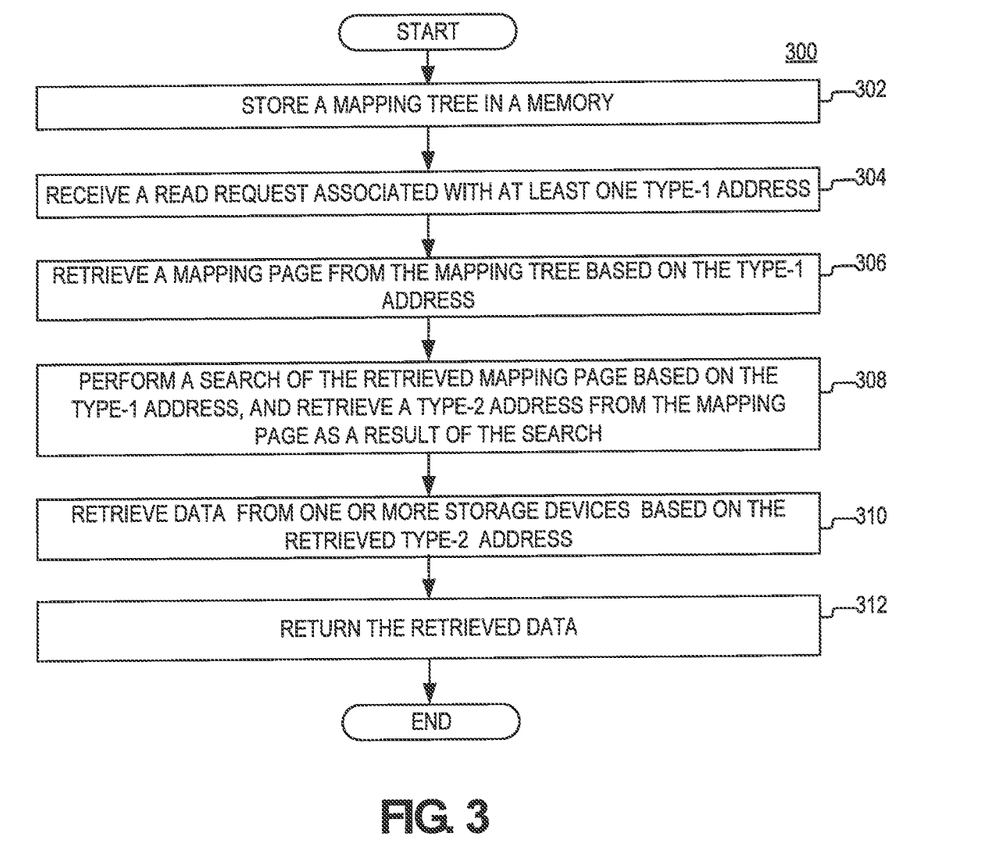
FIG. 3 is a flowchart of an example of a process, according to aspects of the disclosure.

FIG. 3 is a flowchart of a process 300 for executing read requests, according to aspects of the disclosure.

At step 302, a mapping tree is stored in a memory of a computing device. According to the present example, the mapping tree is the same or similar to the mapping tree 140, which is discussed above with respect to FIGS. 2A-C. Furthermore, according to the present example, the mapping tree is represented using an array. The array used to represent the mapping tree may be the same or similar to the array 220, which is discussed above with respect to FIGS. 2A-C. And still furthermore, according to the present example, the computing device may include any of the storage nodes 110 of the storage system 100. However, it will be understood that the process 300 is not limited to being executed by any specific type of computing device. In this regard, it will be understood that the process 300 may be executed on a computing device, such as a laptop or a smartphone, which is not a node in a distributed storage system.

At step 304, a read request is received at the computing device. The read request is associated with a type-1 address. According to the present example, the type-1 address is a logical block address, such as one of the LBAs 212, which are discussed above with respect to FIGS. 2A-C. However, the present disclosure is not limited to any specific implementation of the type-1. address. In this regard, the type-1 address may include any number, string, or alphanumerical string that is derived, at least in part, based on information contained in (or otherwise associated with) the read request.

At step 306, a mapping page is retrieved from the mapping tree based on the type-1 address. The retrieved mapping page may be the same or similar to any of the mapping pages 202, which are discussed above with respect to FIGS. 2A-C. In some implementations, the mapping page may be retrieved by using the process 400, which is discussed further below with respect to FIG. 4.

At step 308, a search is performed of the mapping page based on the type-1 address, and a type-2 address is retrieved as a result of the search. According to the present example, the type-2 address is a physical address, such as any of the physical addresses 214, which are discussed above with respect to FIGS. 2A-2C. However, the present disclosure is not limited to any specific implementation of the type-2 address. In this regard, the type-2 address may include any number, string, or alphanumerical string that can be used (directly or indirectly) to retrieve data from one or more storage devices.

At step 310, data is retrieved from one or more storage devices based on the type-2 address. According to the present example, the one or more storage devices are the same or similar to the storage devices 120, which are discussed above with respect to FIGS. 1-2C. However, it will be understood that the process 300 is not limited to accessing any specific type of storage device. For example, in some implementations, the data may be retrieved from a storage device that is operated in an individual capacity, such as the hard drive of a laptop or the flash memory of a smartphone, etc.

At step 312, the retrieved data is returned to the source of the read request (e.g., an application, a host device, etc.).

Figure 4:
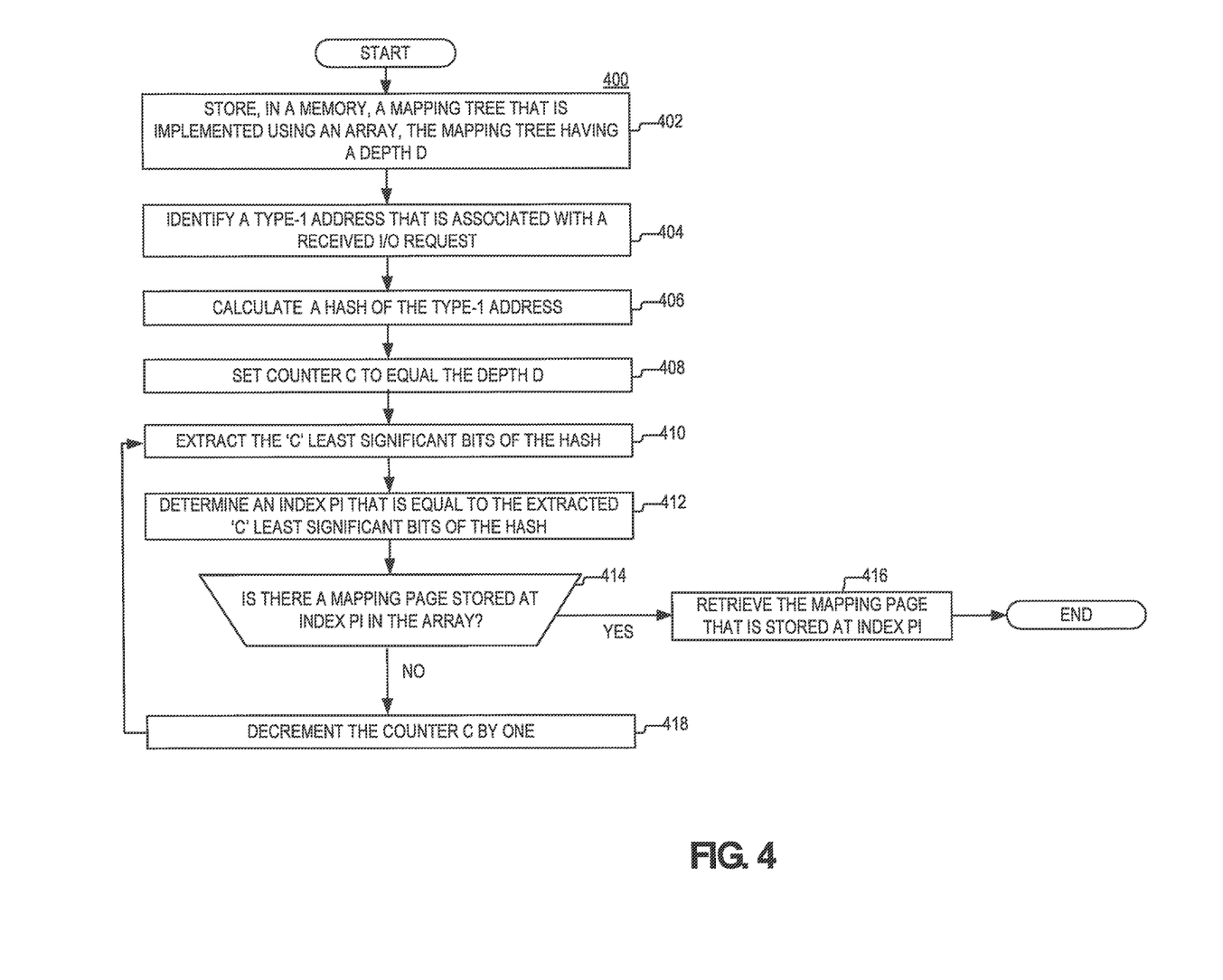
FIG. 4 is a flowchart of an example of a process, according to aspects of the disclosure.

FIG. 4 is a flowchart of a process 400 for retrieving a mapping page from a mapping tree based on a type-1 address, according to aspects of the disclosure. As is discussed further below, the retrieval is performed by calculating hash of the type-1 address, identifying a depth D of the mapping tree, identifying the largest index in the array that: (1) contains a mapping page, and (2) can be represented by D or fewer least significant bits of the hash, and retrieving, from the array, the mapping page that is stored at the identified index.

At step 402, a mapping tree is stored in a memory. According to the present example, the mapping tree is the same or similar to the mapping tree 140, which is discussed above with respect to FIGS. 2A-2C. Furthermore, according to the present example, the mapping tree 140 is be implemented using an array that is the same or similar to the array 220, which is discussed above with respect to FIGS. 2A-2C. And still furthermore, according to the present example, the mapping tree 140 may include a depth attribute, such as the depth attribute 230.

At step 404, a type-1 address is identified that is associated with an I/O request. By way of example, the I/O request may include a read request that is received at the computing device (which is executing the process 400) or a write request that is received at the computing device.

At step 406, a hash (e.g., a hash digest) of the type-1 address is calculated. The hash may be calculated by using SHA1, SHA3, MD5, MD4, Gost, and/or any other suitable type of hashing function. In this regard, it will be understood that the present disclosure is not limited to using any suitable type of hashing function being used to calculate the hash of the type-1 address.

At step 408, a counter C is set to equal the depth of the mapping tree. In some implementations, setting the counter C to equal the depth of the mapping tree may include setting the counter C to equal the depth attribute of the mapping tree. For example, if the mapping three has a depth of 3, the counter C may be set to equal 3. As another example, the mapping three has a depth of 9, the counter C may be set to equal 9.

At step 410, the C least significant bits of the hash are extracted. For example, if the counter C is equal to 3, and the hash is equal to (010011101), the C least significant bits may be "101." As another example, if the counter C is equal to 5, and the hash is equal to (010011101), the C least significant bits may be "11101."

At step 412, an index PI is set to equal the number represented by the extracted C bits. For example, when the extracted bits are "101", the index PI may be set to 5. As another example, when the extracted bits are "11101", the index PI may be set to 29.

At step 414, a determination is made of whether a mapping page is stored in the array at index PI. If a mapping page is stored at index PI (i.e., if the index PI contains a mapping page), the process 400 proceeds to step 416. Otherwise, if no mapping page is stored in the array at index PI, the process 400 proceeds to step 418.

At step 416, the mapping page stored at index PI in the array is retrieved. In some implementations, the retrieved mapping page may be the same or similar to any of the mapping pages 202, which are discussed above with respect to FIGS. 2A-2C.

At step 418, the counter C is decremented, and the process 400 returns to step 410.

Figure 5:
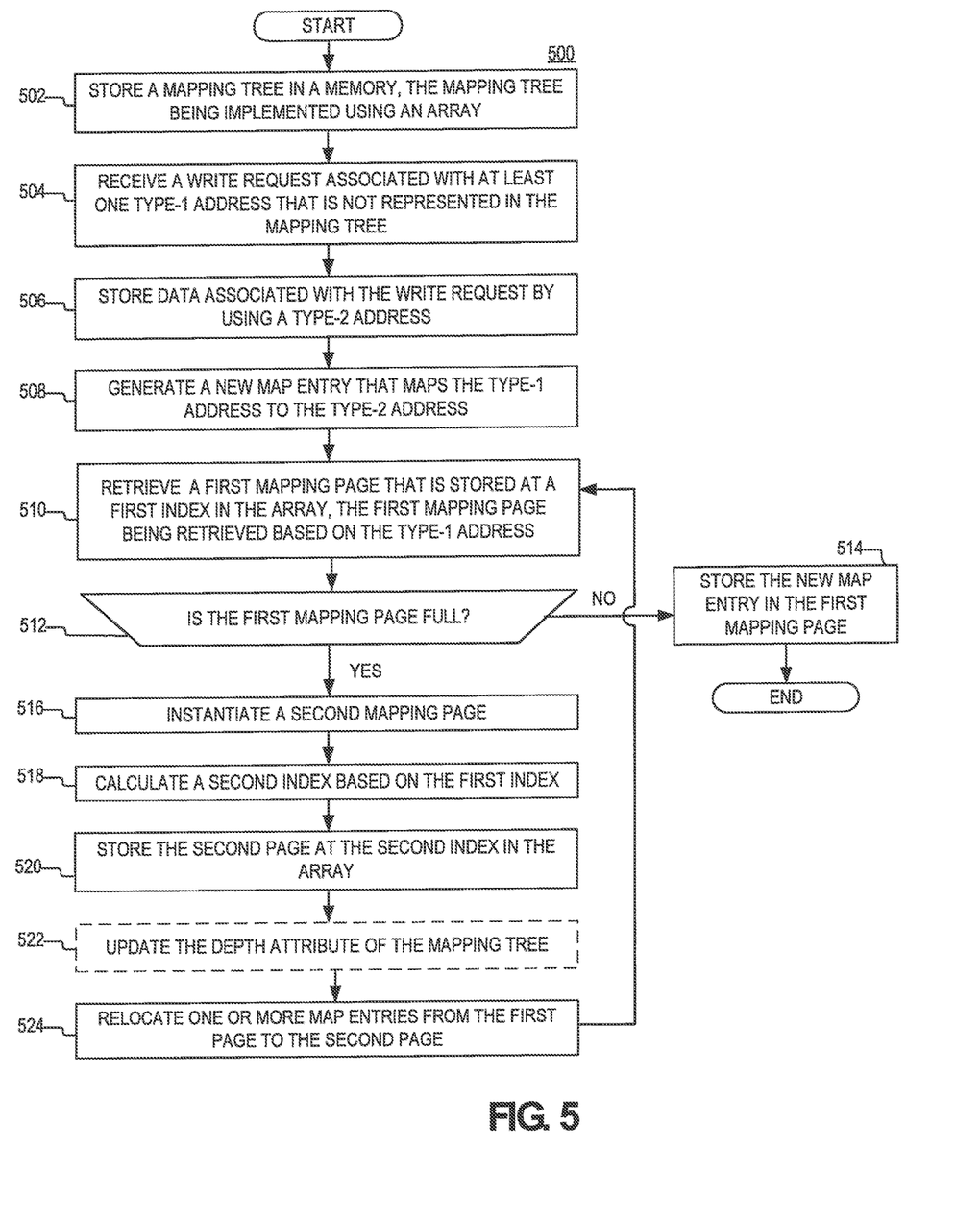
FIG. 5 is a flowchart of an example of a process, according to aspects of the disclosure.

FIG. 5 is a flowchart of a process 500 for executing write requests, according to aspects of the disclosure.

At step 502, a mapping tree is stored in a memory of a computing device. According to the present example, the mapping tree is the same or similar to the mapping tree 140, which is discussed above with respect to FIGS. 1A-1C. Furthermore, according to the present example, the mapping tree is represented using an array. The array may be the same or similar to the array 220, which is discussed above with respect to FIGS. 2A-2C. And still furthermore, according to the present example, the computing device may include any of the storage nodes 110 of the storage system 100. However, it will be understood that the process 500 is not limited to being executed by any specific type of computing device. In this regard, it will be understood that the process 500 may be executed on a computing device, such as a laptop or a smartphone, which is not a node in a distributed storage system.

At step 504, a write request is received at the computing device. The write request is associated with, a type-1 address. According to the present example, the type-1 address is a logical block address, such as one of the LBAs 212, which are discussed above with respect to FIGS. 2A-2C. However, the present disclosure is not limited to any specific implementation of the type-1 address. In this regard, the type-1 address may include any number, string, or alphanumerical string that is derived, at least in part, based on information contained in (or otherwise associated with) the write request.

At step 506, data associated with the write request is stored in one or more storage devices by using a type-2 address. According to the present example, the type-2 address is a physical address, such as any of the physical addresses 214, which are discussed above with respect to FIGS. 2A-C. However, the present disclosure is not limited to any specific implementation of the type-2 address. In this regard, the type-2 address may include any number, string, or alphanumerical string that can be used (directly or indirectly) to store data in one or more storage devices. Furthermore, according to the present example, the one or more storage devices are the same or similar to the storage devices 120, which are discussed above with respect to FIGS. 1-2C. However, it will be understood that the process 500 is not limited to accessing any specific type of storage device. For example, in some implementations, the data may be stored in a storage device that is that is operated in an individual capacity, such as the hard drive of a laptop or the flash memory of a smartphone, etc.

At step 508, a new map entry is generated that maps the type-1 address to the type-2 address. In some implementations, the new map entry may be the same or similar to any of the map entries 210, which are discussed above with respect to FIGS. 2A-2C.

At step 510, a first mapping page is retrieved from the mapping tree based on the type-1 address. The first mapping page may be the same or similar to any of the mapping pages 202, which are discussed above with respect to FIGS. 2A-2C. According to the present example, the first mapping page is stored in the array at a first index, and the first mapping page is retrieved by executing the process 400, which is discussed above with respect to FIG. 3.

At step 512, a determination is made if the first mapping page is full. If the first mapping page is not full, the process 500 proceeds to step 514. Otherwise, if the first mapping page is full, the process 500 proceeds to step 516.

At step 514, the new map entry is stored in the first mapping page.

At step 516, a second mapping page is instantiated.

Figure 6A:
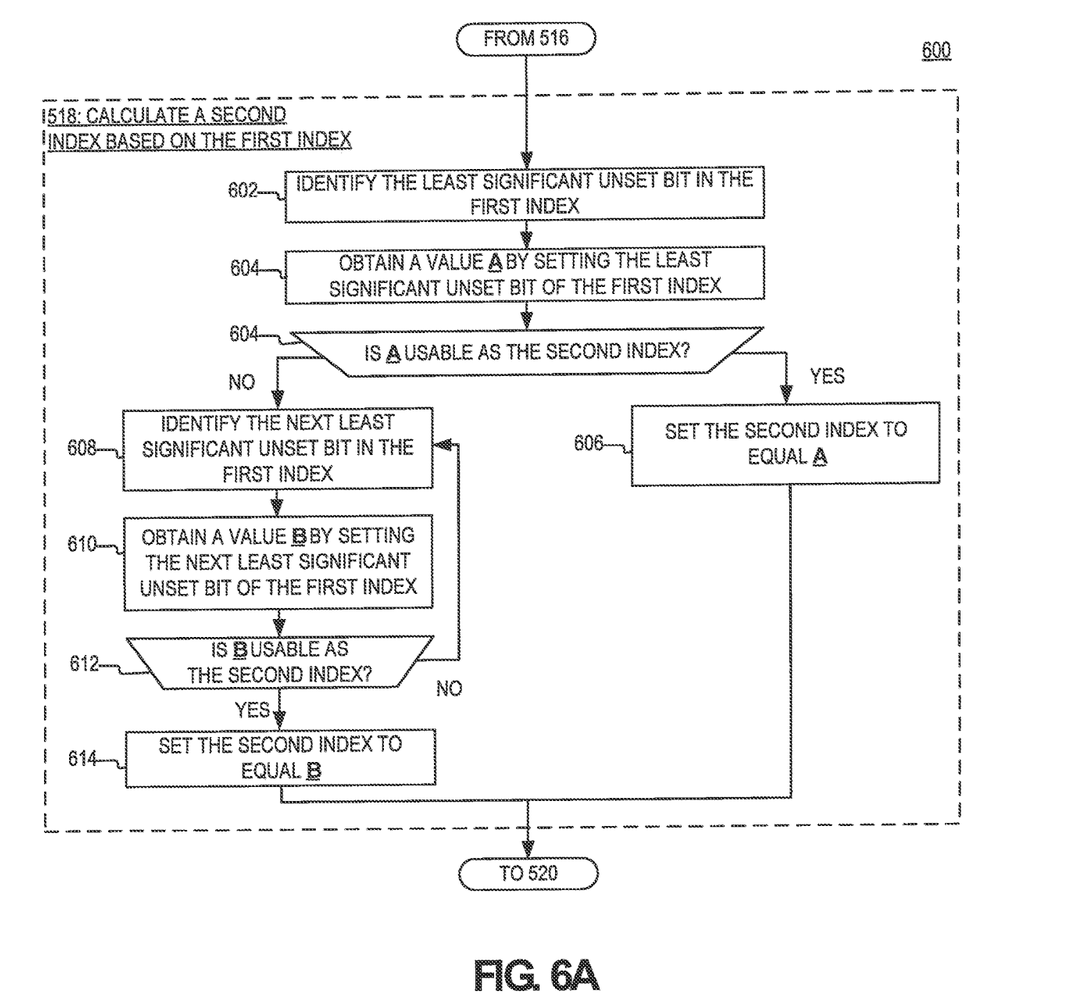
FIG. 6A is a flowchart of an example of a process, according to aspects of the disclosure.

At step 518, a second index is calculated based on the first index. The manner in which step 518 is performed is discussed further below with respect to FIG. 6.

At step 520, the second page is stored in the array, at the second index.

At step 522, the depth attribute of the mapping tree is optionally updated. The manner in which step 522 is executed is discussed further below with respect to FIG. 7.

At step 524, one or more map entries are relocated from the first mapping page to the second mapping page. The relocation may be performed as follows. For each map entry in the first mapping page, a process may be executed which starts with calculating a hash of the type-1 address contained in the map entry. Next, an index in the array is identified, which: (1) contains a mapping page, and (2) can be represented by D or fewer least significant bits of the hash, where D is the current depth of the mapping tree—i.e., the resulting depth of the mapping tree after the second mapping page has been stored in the array. If the identified index is the same as the second index, the map entry is copied from the first page to the second page. Otherwise, if the identified index is the same as the first index, the map entry is allowed to remain stored in the first mapping page. In some implementations, because of the way processes 300-700 (see FIGS. 4-7) are structured, the identified index may be equal, on all occasions, to one of the first mapping page and the second mapping page.

In other words, at step 524, the process 400 may determine whether the LBA of each map entry that is stored in the first mapping page corresponds to the first index (of the first page) or the second index (of the second page), now that the second page has been added to the array. If the LBA corresponds to the first index, the map entry remains stored in the first mapping page. Otherwise, if the LBA corresponds to the second index, the map entry is deleted from the first page and stored in the second page. As discussed above, an entry may correspond to a particular index in an array (used to implement a mapping tree), when this index is the largest index in the array that can be represented by using the D least significant bits of a hash of an LBA that is part of the entry, where D is the depth of the mapping tree.

After step 524 is completed, the process 500 returns to step 510, and steps 510-514 are executed again for the type-1 address. As a result of executing steps 510-514 again, the new map entry is stored in one of the first mapping page and the second page. If the second index (which is larger than the first index) can be represented by D or fewer least significant bits of the hash of the type-1 address, the new map entry is stored in the second mapping page. Otherwise, if the second index cannot be represented by D or fewer least significant bits of the hash of the type-1 address, the new map entry is stored in the first mapping page.

As can be readily appreciated, the process 500 is executed only when a write request is received for a type-1 address that is not represented in the mapping tree. A type-1 address is represented in the mapping tree when the mapping tree contains a map entry corresponding to the type-1 address. In instances in which a write request is received for a type-1 address that is represented in the mapping tree, the map entry for the type-1 address may be identified and modified accordingly, without the generation of a new map entry.

Figure 6B:
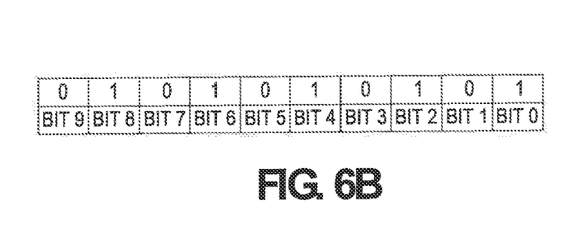
FIG. 6B is a diagram of an example of the binary representation of an index, according to aspects of the disclosure.

FIGS. 6A-6B show an example of a process 600 for determining a second index for a second mapping page based on a first index of a first mapping page, as specified by step 518 of the process 500. As is discussed further below, the process 600 determines the second index by taking the first index and flipping one-by-one the unset bits in the first index, until an index value that does not contain a mapping page is derived (i.e., an index value in the array—discussed with respect to FIG. 5—at which no mapping pages are stored).

At step 602, the least significant unset bit of the first index is identified. An unset bit, according to the present disclosure, is a bit that is equal to '0', and a set bit is one that is equal to '1'. As illustrated in FIG. 613, the binary representation of the first index is '0101010101', and the least significant unset bit in the first index is 'bit 1'.

At step 604, a value A is obtained by setting least significant bit of the first index. According to the present example, the value A is equal to '0101010111' (decimal 343). At step 606, a determination is made if the array (used to implement the mapping tree) already contains a mapping page stored at index A (i.e., at index 343). If there is no mapping page stored at index A, the process proceeds to step 606. Otherwise, if there is a mapping page that is already stored at index A in the array, the process 600 proceeds to step 608. At step 606, the second index is set to equal A.

At step 608, the next unset least significant bit in the first array is identified. At step 610, a value B is obtained by setting the next unset least significant bit. At step 612, a determination is made if the array already contains a mapping page stored at index B. If there is no mapping page stored at index B, the process 600 proceeds to step 614. Otherwise, if there is a mapping page that is already stored at index B in the array, the process 600 returns to step 608. At step 414, the second index is set to equal B.

According to the present example, in the first iteration of steps 610-614, the next unset least significant bit in the first index would be 'bit 3', and the value of B would be '0101011101' (decimal 349). In the second iteration of steps 610-614, the next least significant bit in the first index would be 'bit 5', and the value of B would be '0101110101' (decimal 373). In the third iteration of steps 610-614, the next unset least significant bit in the first index would be 'bit 7', and the value of B would be '0111010101' (decimal 469). In the third iteration of steps 610-614, the next unset least significant bit in the first index would be 'bit 9', and the value of B would be '1101010101' (decimal 853). In some implementations, at each iteration of steps 610-614, the value B may be generated by flipping only 1 of the bits in the first index (i.e., the "next" least significant bit, etc.)

Figure 7:
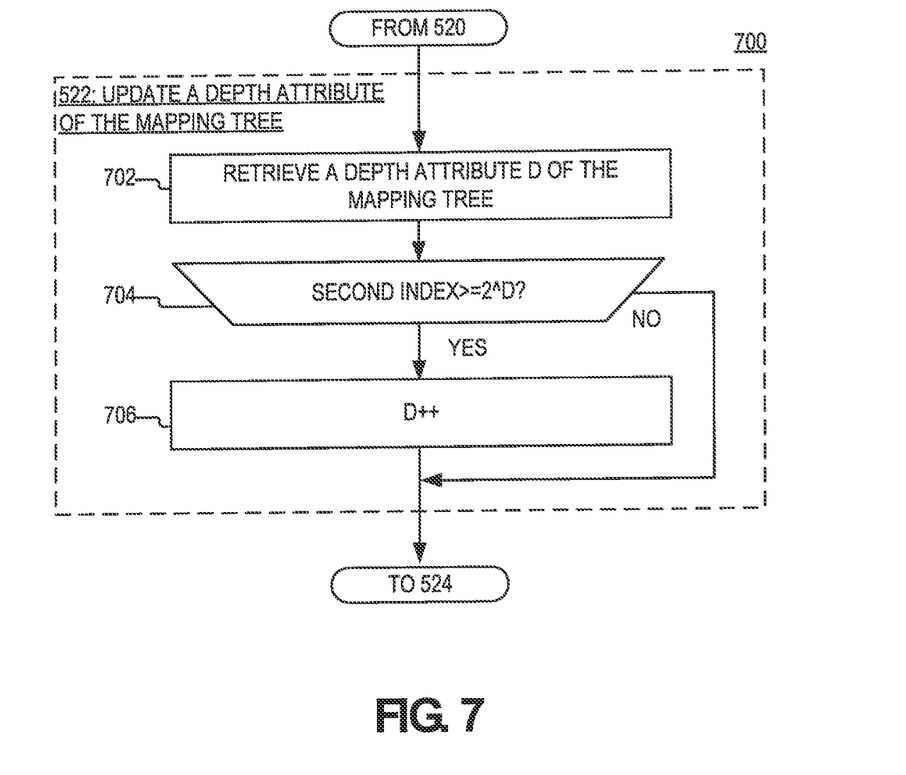
FIG. 7 is a flowchart of an example of a process, according to aspects of the disclosure.

FIG. 7 is a flowchart of an example a process 700 for updating the depth attribute of the mapping tree, as specified by step 522 of the process 500. At step 702, the depth attribute of the mapping tree is retrieved from memory. At step 704, a determination is made if the second index (calculated at step 518) is greater than or equal to 2^D, where D is the value of the depth attribute (e.g., a positive integer). If the second index is greater than or equal to 2^D, the process 700 proceeds to step 706. Otherwise, if the second index is not greater than or equal to 2^D the process 700, terminates. At step 706, the depth attribute of the mapping tree is incremented by one.

Referring to FIG. 8, in some implementations, any of the processes discussed with respect to FIGS. 1-7 may be executed by one or more computing devices 800. Each computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes discussed with respect to FIGS. 1-7.

FIGS. 1-8 are provided as an example only. At least some of the steps discussed with respect to FIGS. 1-8 can be performed concurrently, performed in a different order, or altogether omitted. According to the example of FIGS. 1-8, little-endian notation is used to represent binary numbers. However, it will be understood that alternative implementations are possible, in which big-endian notation is used. In this regard, it will be understood that the present disclosure is not limited to any specific position of the least significant bit in a binary string. Although in the example of FIG. 2C, the mapping tree 140 includes a depth attribute 230, alternative implementations are possible in which the depth attribute is omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    storing, in a memory, a mapping tree that is implemented by using an array of mapping pages, the mapping tree having a depth of D, wherein D is an integer greater than or equal to 0;
    receiving a write request that is associated with a first type-1 address;
    storing, in a storage device, data associated with the write request, the data associated with the write request being stored in the storage device based on a first type-2 address;
    generating a map entry that maps the first type-1 address to the first type-2 address;
    calculating a first hash digest of the first type-1 address; and
    storing the map entry in a first mapping page, the first mapping page being located at a first index in the array, wherein the first index is the largest index in the array that contains a mapping page among all indices in the array that can be represented by D or fewer least significant bits of the first hash digest.

2. The method of claim 1, further comprising:
    receiving a read request that is associated with a second type-1 address
    calculating a second hash digest of the second type-1 address;
    retrieving a second mapping page that is located at a second index in the array, wherein the second index is the largest index in the array that contains a mapping page among all indices in the array that can be represented by D or fewer least significant bits of the second hash digest
    performing search of the second mapping page to identify a second type-2 address that is mapped to the second type-1 address;
    retrieving data from the storage device based on the second type-2 address; and
    returning the retrieved data to a sender of the read request.

3. The method of claim 1, wherein storing the map entry includes:
    retrieving a mapping page $P_1$ that is stored at an index $I_1$ in the array, wherein the index $I_1$ is the largest index in the array that contains a mapping page among all indices in the array that can be represented by D or fewer least significant bits of the first hash digest;
    detecting whether the mapping page $P_1$ is full;
    when the mapping page $P_1$ is not full: storing the map entry in the mapping page $P_1$;
    when the mapping page $P_1$ is full; generating a mapping page $P_2$, adding the mapping page $P_2$ at an index $I_2$ in the array, transferring one or more mapping entries from the mapping page $P_1$ to the mapping page $P_2$, and storing the map entry in one of the mapping page $P_1$ or the mapping page $P_2$.

4. The method of claim 3, wherein the index $I_2$ is greater than the index $I_1$, and the map entry is stored in the mapping page $P_2$ only when the index $I_2$ can be represented by D or fewer least significant bits of the first hash digest.

5. The method of claim 3, wherein the index $I_2$ is generated by setting a least significant unset bit of the index $I_1$.

6. The method of claim 1, wherein the first type-1 address is a logical block address (LBA) in a first address space of a data volume and the first type-2 address is an address in a second address space of the storage device.

7. The method of claim 1, wherein the first type-1 address is a logical block address (LBA) in a first address space of a data volume and the first type-2 address is an address in a second address space of a storage array including the storage device.

8. A system, comprising:
  a memory configured to store storing a mapping tree that is implemented by using an array of mapping pages, the mapping tree having a depth of D, wherein D is an integer greater than or equal to 0; and
  a processing circuitry operatively coupled to the memory, the processing circuitry being configured to perform the operations of:
  receiving a write request that is associated with a first type-1 address;
  storing, in a storage device, data associated with the write request, the data associated with the write request being stored in the storage device based on a first type-2 address;
  generating a map entry that maps the first type-1 address to the first type-2 address;
  calculating a first hash digest of the first type-1 address; and
  storing the map entry in a first mapping page, the first mapping page being located at a first index in the array, wherein the first index is the largest index in the array that contains a mapping page among all indices in the array that can be represented by D or fewer least significant bits of the first hash digest.

9. The system of claim 8, wherein the processing circuitry is further configured to perform the operations of:
  receiving a read request that is associated with a second type-1 address
  calculating a second hash digest of the second type-1 address;
  retrieving a second mapping page that is located at a second index in the array, wherein the second index is the largest index in the array that contains a mapping page among all indices in the array that can be represented by D or fewer least significant bits of the second hash digest,
  performing search of the second mapping page to identify a second type-2 address that is mapped to the second type-1 address;
  retrieving data from the storage device based on the second type-2 address; and
  returning the retrieved data to a sender of the read request.

10. The system of claim 8, wherein storing the map entry includes:
  retrieving a mapping page $P_1$ that is stored at an index $I_1$ in the array, wherein the index $I_1$ is the largest index in the array that contains a mapping page among all indices in the array that can be represented by D or fewer least significant bits of the first hash digest;
  detecting whether the mapping page $P_1$ is full;
  when the mapping page $P_1$ is not full: storing the map entry in the mapping page $P_1$;
  when the mapping page $P_1$ is full: generating a mapping page $P_2$, adding the mapping page $P_2$ at an index $I_2$ in the array, transferring one or more mapping entries from the mapping page $P_1$ to the mapping page $P_2$, and storing the map entry in one of the mapping page $P_1$ or the mapping page $P_2$.

11. The system of claim 10, wherein the index $I_2$ is greater than the index $I_1$, and the map entry is stored in the mapping page $P_2$ only when the index $I_2$ can be represented by D or fewer least significant bits of the first hash digest.

12. The system of claim 10, wherein the index $I_2$ is generated by setting a least significant unset bit of the index $I_1$.

13. The system of claim 8, wherein the first type-1 address is a logical block address (LBA) in a first address space of a data volume and the first type-2 address is an address in a second address space of the storage device.

14. The system of claim 8,
  wherein the first type-1 address is a logical block address (LBA) in a first address space of a data volume and the first type-2 address is an address in a second address space of a storage array including the storage device.

15. A non-transitory computer-readable medium storing one or more processor-executable instructions, which when executed by at least one processor, cause the at least one processor to perform the operations of:
  storing, in a memory, a mapping tree that is implemented by using an array of mapping pages, the mapping tree having a depth of D, wherein D is an integer greater than or equal to 0;
  receiving a write request that is associated with a first type-1 address;
  storing, in a storage device, data associated with the write request, the data associated with the write request being stored in the storage device based on a first type-2 address;
  generating a map entry that maps the first type-1 address to the first type-2 address;
  calculating a first hash digest of the first type-1 address; and
  storing the map entry in a first mapping page, the first mapping page being located at a first index in the array, wherein the first index is the largest index in the array that contains a mapping page among all indices in the array that can be represented by D or fewer least significant bits of the first hash digest.

16. The non-transitory computer-readable medium of claim 15, wherein the processor-executable instructions, when executed by the at least one processor, further cause the at least one processor to perform the operations of:
  receiving a read request that is associated with a second type-1 address
  calculating a second hash digest of the second type-1 address;
  retrieving a second mapping page that is located at a second index in the array, wherein the second index is the largest index in the array that contains a mapping page among all indices in the array that can be represented by D or fewer least significant bits of the second hash digest,
  performing search of the second mapping page to identify a second type-2 address that is mapped to the second type-1 address;
  retrieving data from the storage device based on the second type-2 address; and
  returning the retrieved data to a sender of the read request.

17. The non-transitory computer-readable medium of claim 15, wherein storing the map entry includes:
  retrieving a mapping page $P_1$ that is stored at an index $I_1$ in the array, wherein the index $I_1$ is the largest index in the array that contains a mapping page among all indices in the array that can be represented by D or fewer least significant hits of the first hash digest;
  detecting whether the mapping page $P_1$ is full;

when the mapping page $P_1$ is not full: storing the map entry in the mapping page $P_1$;

when the mapping page $P_1$ is full: generating a mapping page $P_2$, adding the mapping page $P_2$ at an index $I_2$ in the array, transferring one or more mapping entries from the mapping page $P_1$ to the mapping page $P_2$, and storing the map entry in one of the mapping page $P_1$ or the mapping page $P_2$.

18. The non-transitory computer-readable medium of claim 17, Wherein the index $I_2$ is greater than the index $I_1$, and the map entry is stored in the mapping page $P_2$ only when the index $I_2$ can be represented by D or fewer least significant bits of the first hash digest.

19. The non-transitory computer-readable medium of claim 17, wherein the index $I_2$ is generated by setting a least significant unset bit of the index $I_1$.

20. The non-transitory computer-readable readable medium of claim 15, wherein the first type-1 address is a logical block address (LBA) in a first address space of a data volume and the first type-2 address is an address in a second address space of the storage device.

\* \* \* \* \*